US006898091B2

(12) United States Patent
Van Bodegraven et al.

(10) Patent No.: US 6,898,091 B2
(45) Date of Patent: May 24, 2005

(54) CIRCUIT CONFIGURATION COMPRISING A CONTROL LOOP

(75) Inventors: Tijmen Cornelis Van Bodegraven, Eindhoven (NL); Reinhold Elferich, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/479,091

(22) PCT Filed: May 30, 2002

(86) PCT No.: PCT/IB02/02067

§ 371 (c)(1),
(2), (4) Date: Nov. 25, 2003

(87) PCT Pub. No.: WO02/097958

PCT Pub. Date: Dec. 5, 2002

(65) Prior Publication Data

US 2004/0145923 A1 Jul. 29, 2004

(30) Foreign Application Priority Data

Jun. 1, 2001 (DE) .......................... 101 26 925

(51) Int. Cl.[7] ............................................. H02M 3/335
(52) U.S. Cl. ..................... 363/21.02; 363/55; 363/97
(58) Field of Search ..................... 363/20, 21.1, 21.02, 363/21.03, 55, 95, 97

(56) References Cited

U.S. PATENT DOCUMENTS 4,578,630 A    3/1986  Grosch .................... 323/271
6,212,079 B1   4/2001  Balakrishnan et al. ........ 363/21
6,301,128 B1 * 10/2001  Jang et al. .................... 363/17

FOREIGN PATENT DOCUMENTS

EP     0883230     12/1998     ............ H02M/3/28

OTHER PUBLICATIONS

Patent Abstracts of Japan, vol. 1998, No. 10, (Aug. 31, 1998), & JP 10 127047 A (Canon Inc.), (May 5, 1998) Zusammenfassung.

* cited by examiner

Primary Examiner—Adolf Berhane
(74) Attorney, Agent, or Firm—Frank Keegan

(57) ABSTRACT

A circuit arrangement is disclosed with a regulating circuit which is particularly used for regulating a resonant converter having a plurality of outputs. The arrangement includes a protective circuit that can be constructed with the least possible circuitry and cost. The regulating circuit is used for generating a pulse-width modulated regulation signal (20) in dependence on measuring signals (Va, Vb) present on inputs of the regulating circuit (20). The arrangement further includes a comparator circuit (212) for comparing the duty cycle ($\delta$) of the regulation signal (20) with a predefinable maximum duty cycle value ($\delta$max) and minimum duty cycle value ($\delta$min), in which in case of a duty cycle ($\delta$) situated outside the range between the maximum duty cycle value ($\delta$max) and the minimum duty cycle value ($\delta$min) the circuit arrangement delivers control information that corresponds to this exceeding of the range.

12 Claims, 8 Drawing Sheets

CIRCUIT CONFIGURATION COMPRISING A CONTROL LOOP

The invention relates to a circuit arrangement with a regulating circuit which is particularly used for regulating a resonant converter having a plurality of outputs.

In resonant converters a DC voltage carried on the input side is first chopped and the AC voltage thus produced in the form of a chopped DC voltage is processed by means of circuit parts containing resonant circuit elements.

Transformers, particularly ones that produce an electrical separation of the input and output side of the converter are used for this purpose. With converters of this type it is possible to manufacture inexpensive, small and light-weight power supply units/switched-mode power supplies, which can advantageously be used in consumer electronics appliances such as set top boxes, satellite receivers, television sets, computer monitors, video recorders and compact audio systems. In these applications there is often a need for converters that generate multiple output voltages on multiple converter outputs from one input DC voltage.

In German patent application no. 101 22 534.2 (data of filing Sep. 5, 2001) is described a resonant converter which has a plurality of outputs and comprises a transformer having one primary winding and at least two secondary windings having different winding orientations. The converter also includes a regulating circuit for regulating the converter output voltages.

A known concept for a converter protection circuit includes the use of secondary side fuses which are gone when they are overloaded. Before the converter is operated again, the fuses that have blown are to be replaced by new fuses.

It is an object of the invention to provide a circuit arrangement comprising a regulating circuit for converters having a plurality of outputs, which circuit arrangement includes a protective circuit that can be manufactured with the least possible circuitry and expense and calculation effort which is a reliable protection against cases of overload.

The object is achieved by a circuit arrangement comprising a regulating circuit which is used for generating a pulse-width modulated regulation signal in dependence on two measuring signals present on inputs of the regulating circuit, and including a comparator circuit for comparing the duty cycle of the regulating circuit with a predefinable maximum and minimum duty cycle value, while in case of a duty cycle situated outside the range between the maximum duty cycle value and the minimum duty cycle value the circuit arrangement delivers control information that corresponds to this exceeding of the range.

In case of overload this circuit arrangement is in a position to reliably switch off a converter. The protective circuit can be constructed with few cost-effective components.

The control information is delivered more particularly by simply switching off the regulation signal i.e. setting the regulation signal to the zero value (claim 2); other variants would be here the transmission of the digital signal within the regulation signal or the delivery of a control signal via a separate output of the circuit arrangement. The claims 3 to 5 characterize an overvoltage protection which is a precise and reliable protection against overvoltages and co-operates with the overload protective circuit. Claim 6 makes a feedback loop possible with which even if an optocoupler fails there is still a feedback path available for transmitting feedback signals which cause the connected converter to be switched off.

The invention also relates to integrated circuits which include parts of the circuit arrangement according to the invention (claims 7 to 9).

Furthermore, the invention relates to a resonant converter which includes the circuit arrangement according to the invention and/or at least one of the integrated circuits according to the invention (claim 10).

The invention will be further described with reference to examples of embodiment shown in the drawings, to which, however the invention is not restricted. In the drawings.

Figure 8:
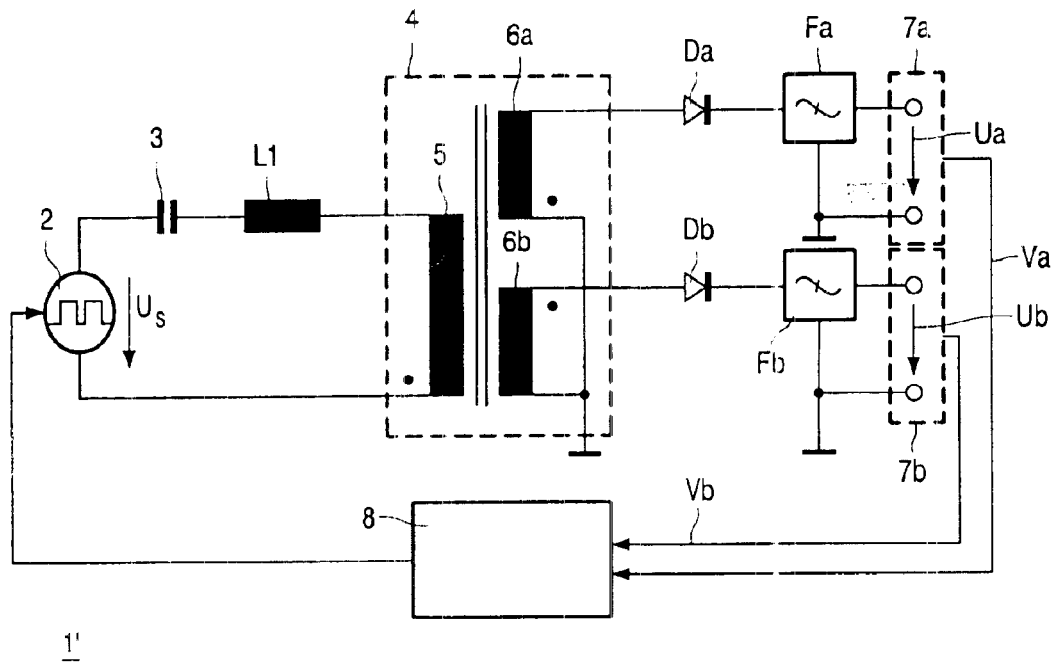
Figure 9:
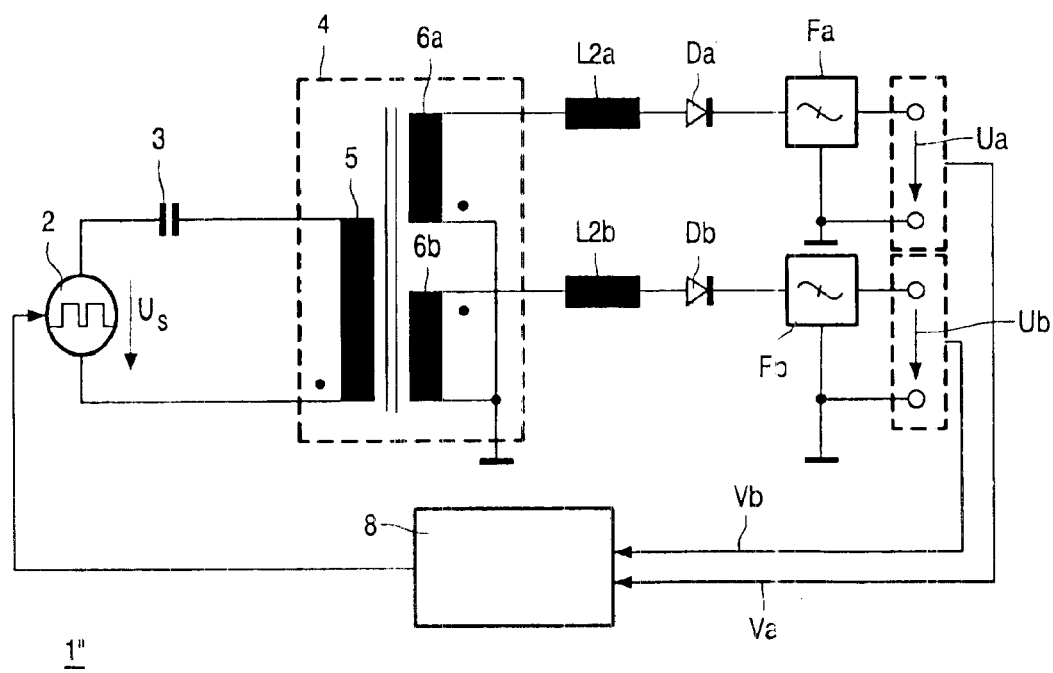
Figure 10:
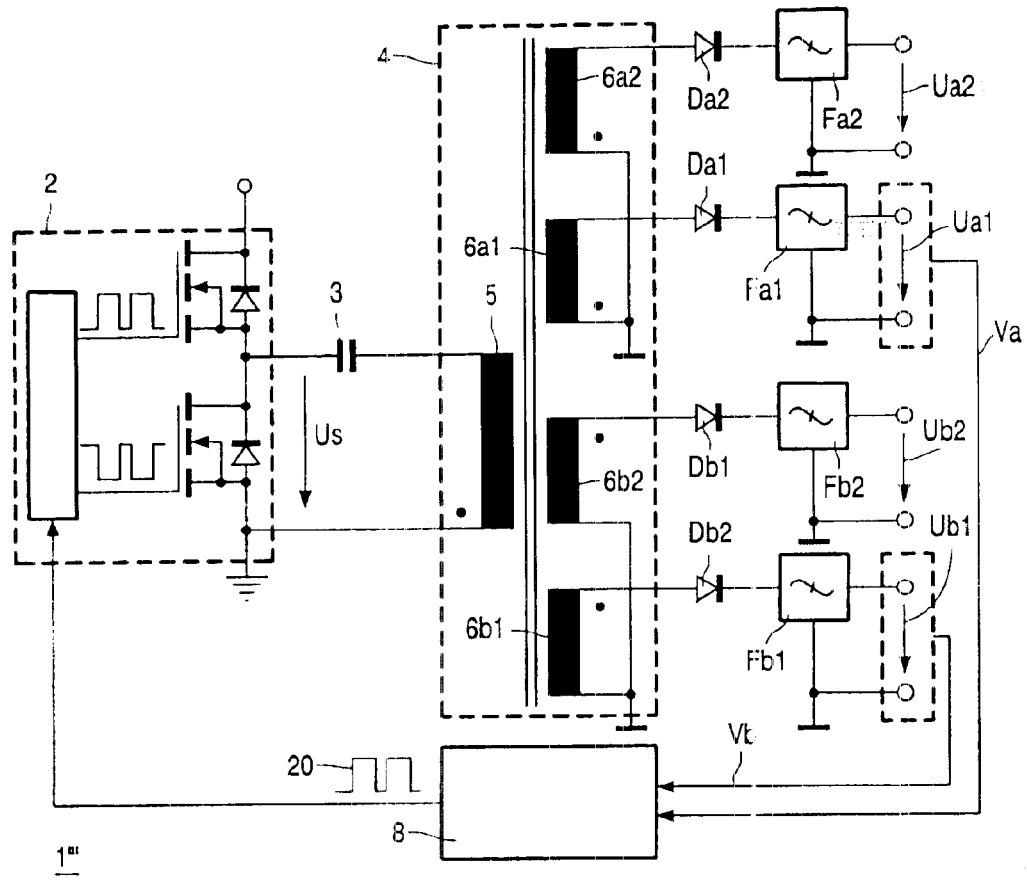
Figure 11:
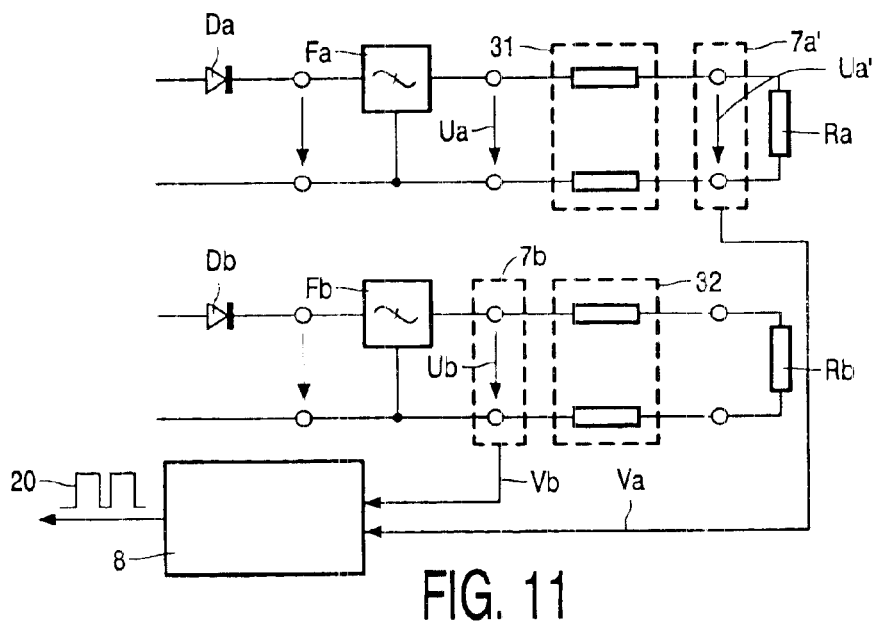
Figure 12:
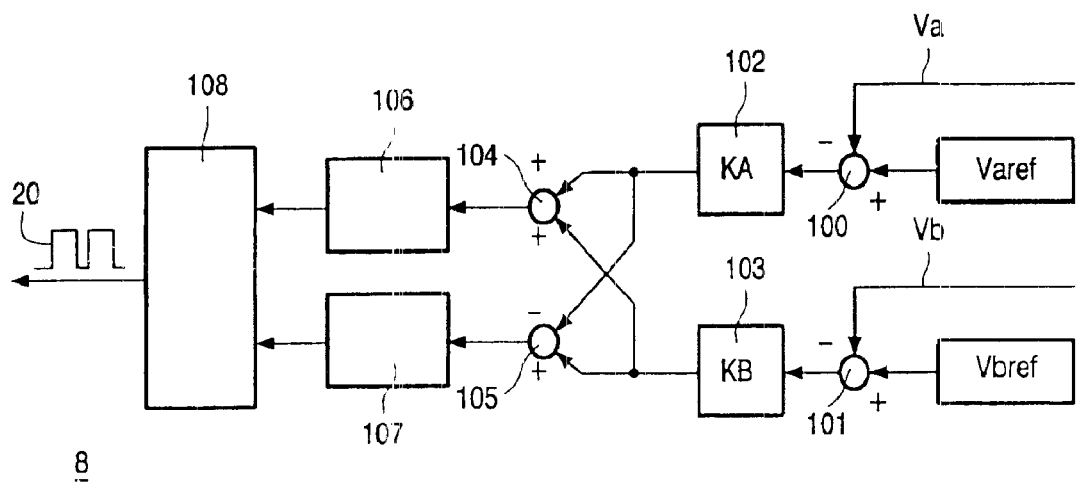
Figure 13:
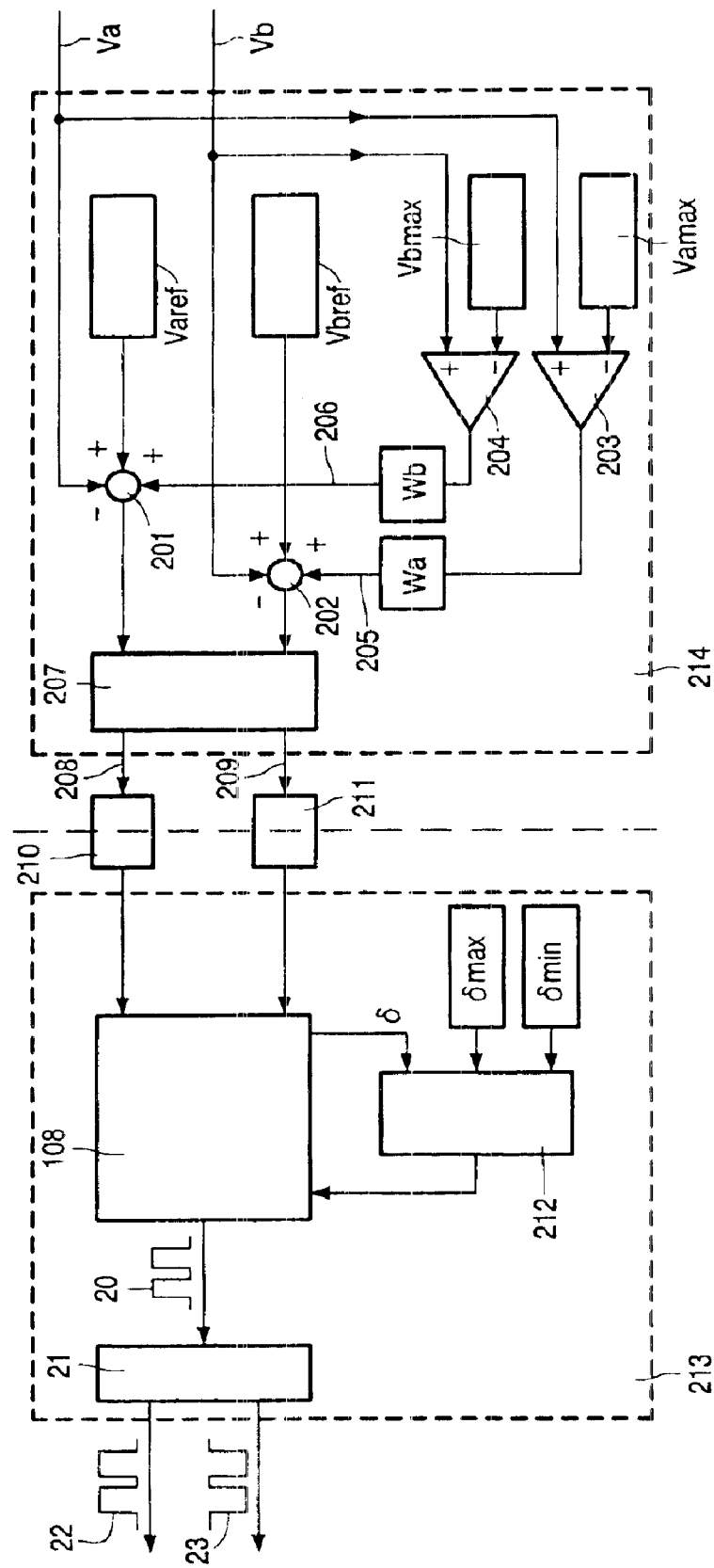

FIGS. 8 to 10 show various options of embodiments for a resonant converter according to the invention, FIG. 11 shows an example of the coupling of converter outputs to the regulating circuit of the resonant converter, FIG. 12 shows a block diagram for a design variant of the regulating circuit of the resonant converter and FIG. 13 shows a block diagram for a regulating circuit with overvoltage and overload protection circuits.

Figure 1:
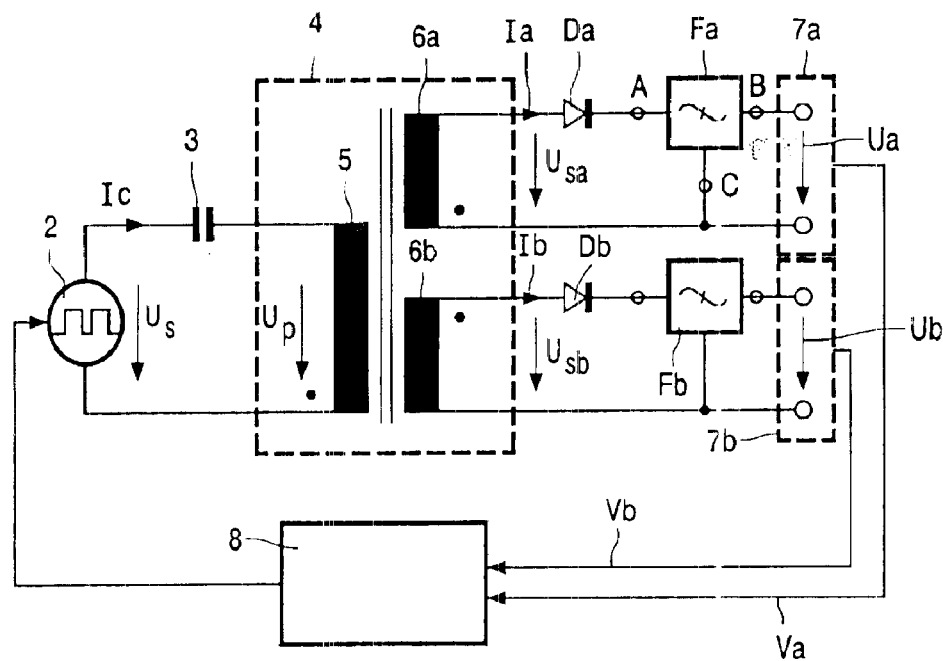
FIG. 1 shows a resonant converter having two outputs.

The circuit arrangement shown in FIG. 1 shows a resonant converter 1 having an inverter 2 which is here designed as a chopper and converts a DC voltage (not shown) into an AC voltage i.e. in this case chopped DC voltage Us. The inverter 2 is coupled by a capacitor to a transformer 4, which has one primary winding 5 and two secondary windings 6a and 6b. The secondary windings 6a and 6b have different winding directions, so that given a positive voltage Up on the primary winding 5 the voltage Usa generated on the secondary winding 6a is also positive, whereas given a positive voltage Up, the dropping voltage Usb on the secondary winding 6b is negative. The transformer 4 has a common transformer core both for the primary winding 5 and for the secondary windings 6a and 6b. A current flowing through the capacitor 3 in the primary winding 5 is denoted by Ic.

The secondary winding 6a is coupled by way of a diode Da and an output filter Fa to an output 7a, on which an output voltage Ua is dropping. The secondary winding 6b is connected by a diode Db and a filter Fb to an output 7b, on which an output voltage Ub is dropping. The converter 1 furthermore contains a feedback loop with a regulating circuit 8, which is coupled on the input side to the outputs 7a and 7b of the converter 1 and on the output side to the inverter 2. The regulating circuit 8 sets the frequency and the duty cycle of the voltage Us supplied by the inverter 2 as a function of the voltages Ua and Ub present on the outputs 7a and 7b, in order to regulate the output voltages Ua and Ub to desired predefined voltage values.

In the resonant converter 1, the capacitor 3, the main inductance and the leakage inductances of the transformer 4 constitute resonant circuit elements, which are induced to oscillate by the a-c voltage Us and produce a corresponding behavior of the current Ic flowing into the circuit part that includes the resonant circuit elements and of the voltage Up dropping on the primary winding. In the case of positive voltage values of the voltage Up, a current Ia is generated, which flows through the diode Da to the filter Fa for the time during which, in this operating state, the voltage Usa exceeds the voltage present on the input of the filter Fa minus the diode forward voltage over the diode Da. If the voltage Up on the primary winding 5 has positive voltage values, no current is generated by the secondary winding 6b, since the diode Db blocks in this case.

In the event of negative voltage values of the voltage Up there is a positive voltage Usb present on the secondary winding 6b and a negative voltage Usa on the secondary winding 6a. In this case a current Ib is generated, which flows from the secondary winding 6b through the diode Db to the output filter Fb for the period of time during which, in this operating state, the voltage Usb exceeds the voltage present on the input of the filter Fb minus the diode forward voltage over the diode Db.

Figure 2:
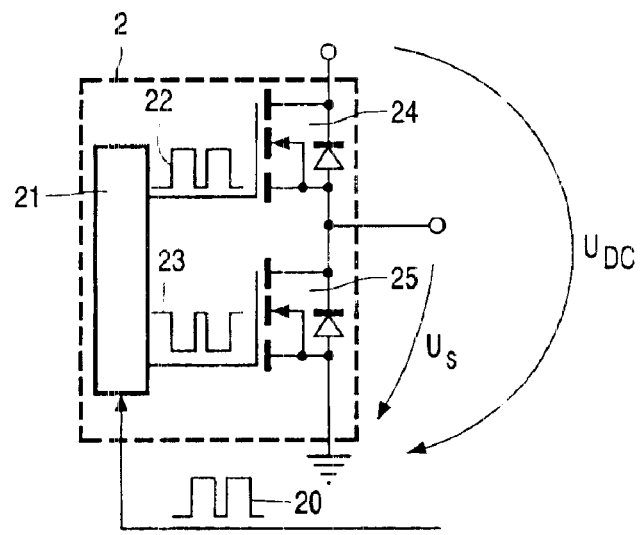
FIG. 2 shows a half-bridge circuit for the resonant converter.

FIG. 2 shows a design variant of the inverter or chopper 2 in FIG. 1. An actuating signal 20, here represented by a pulse sequence, generated by the regulating circuit 8, is fed to a half-bridge driver circuit 21, which generates from the actuating signal 20 control signals 22 and 23 for the switching elements 24 and 25, which form a half-bridge circuit. The switching elements 24 and 25 are designed as MOSFET transistors. The control signals 22 and 23 are fed to gate connections (control connections) of the transistors 24 and 25. The inverter 2 converts a d-c voltage $U_{DC}$ into the a-c voltage Us by alternately switching the switching elements 24 and 25 on and off. The d-c voltage $U_{DC}$ is generated, in power supply units/power packs/chargers, for example, from the a-c voltage of an a-c voltage mains by means of rectifiers.

Figure 3A:
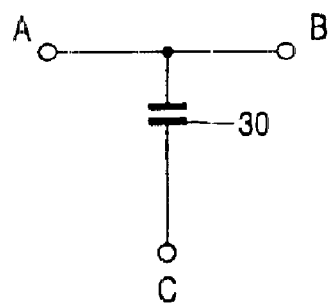
FIGS. 3A, 3B and 3C show various output filters for the resonant converter.
Figure 3B:
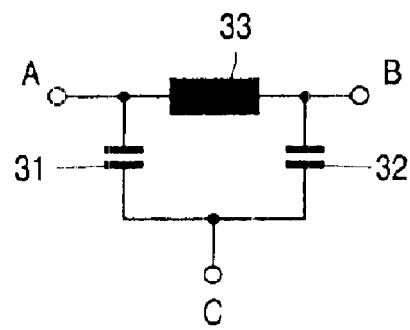
Figure 3C:
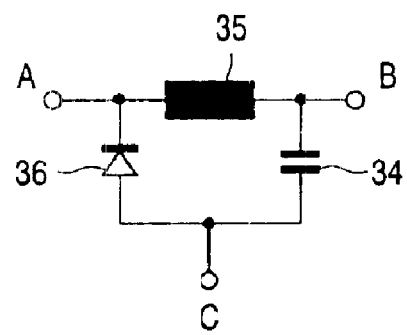

FIGS. 3A to 3C show design variants of the output filters Fa and Fb of the resonant converter 1. These have a connection A, which is connected to the diodes Da and Db. The connections B and C are connected to the outputs 7a and 7b of the converter 1. The filter according to FIG. 3 only contains a capacitor 30. The output filter according to FIG. 3B includes two capacitors 31 and 32 and one inductance 33. The output filter according to FIG. 3C contains a capacitor 34, an inductance 35 and a diode 36.

Figure 4:
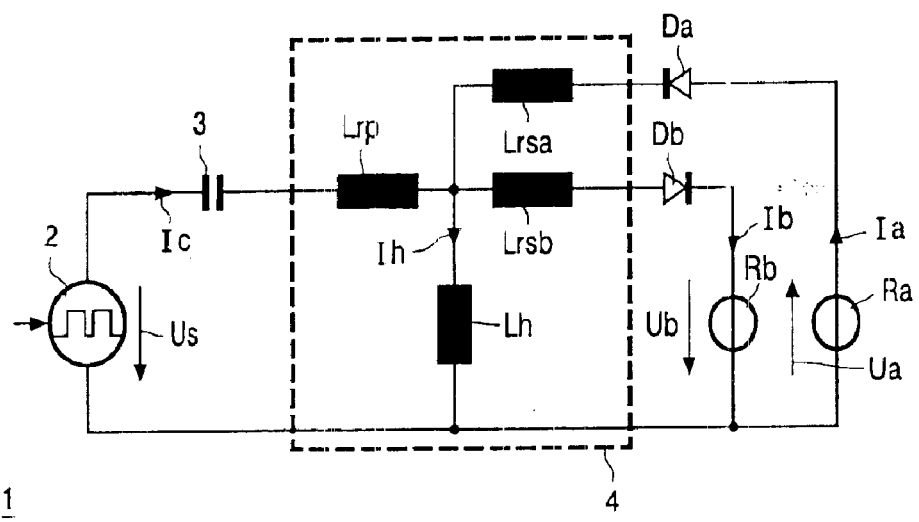
FIG. 4 shows an equivalent circuit diagram for the resonant converter.

FIG. 4 shows an equivalent circuit diagram for the resonant converter 1 in FIG. 1, in which the transformer 4 has been replaced by a transformer equivalent circuit diagram. Here the electrical function of the transformer 4 may essentially be represented by a primary-side leakage inductance Lrp, a main inductance Lh, a secondary-side leakage inductance Lrsa for the secondary winding 6a and a secondary-side leakage inductance Lrsb for the secondary winding 6b. The filters Fa and Fb are here assumed as ideal and not shown, as is the regulating circuit 8. Loads Ra and Rb are connected to outputs 7a and 7b of the converter 1.

Figure 5:
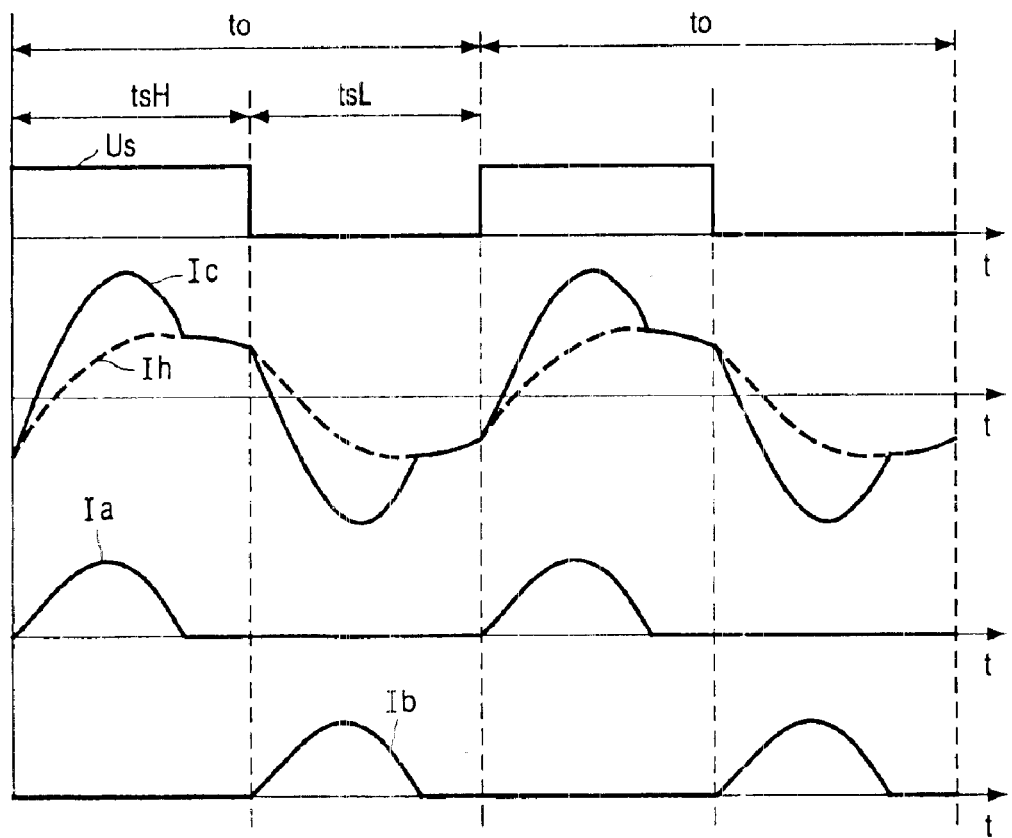
FIGS. 5 to 7 show voltage and current curves in the resonant converter.
Figure 6:
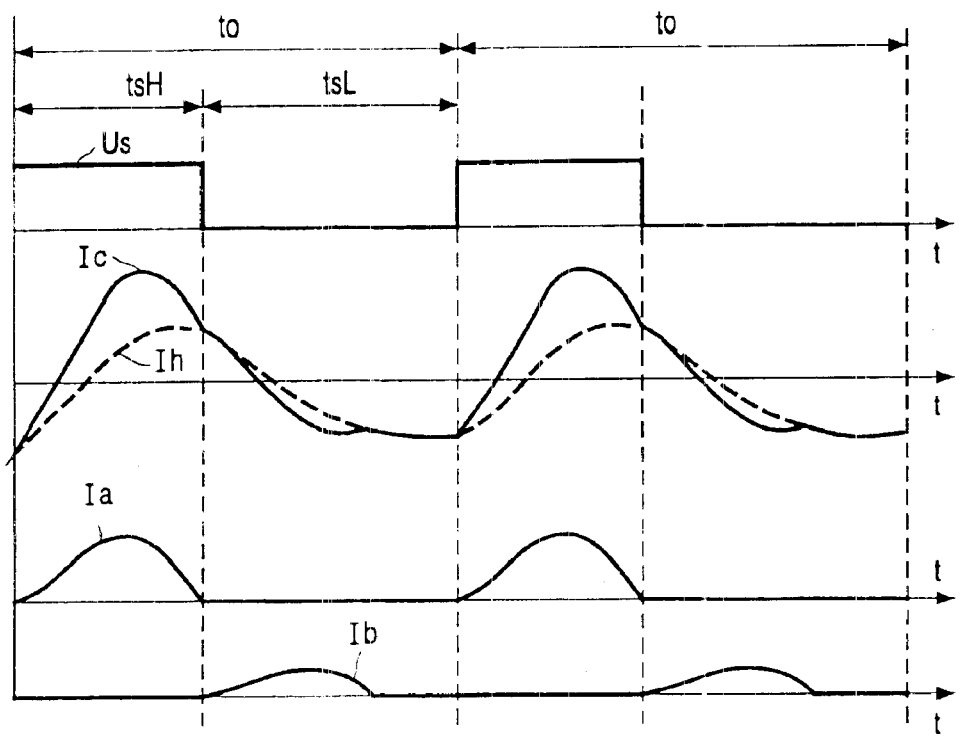
Figure 7:
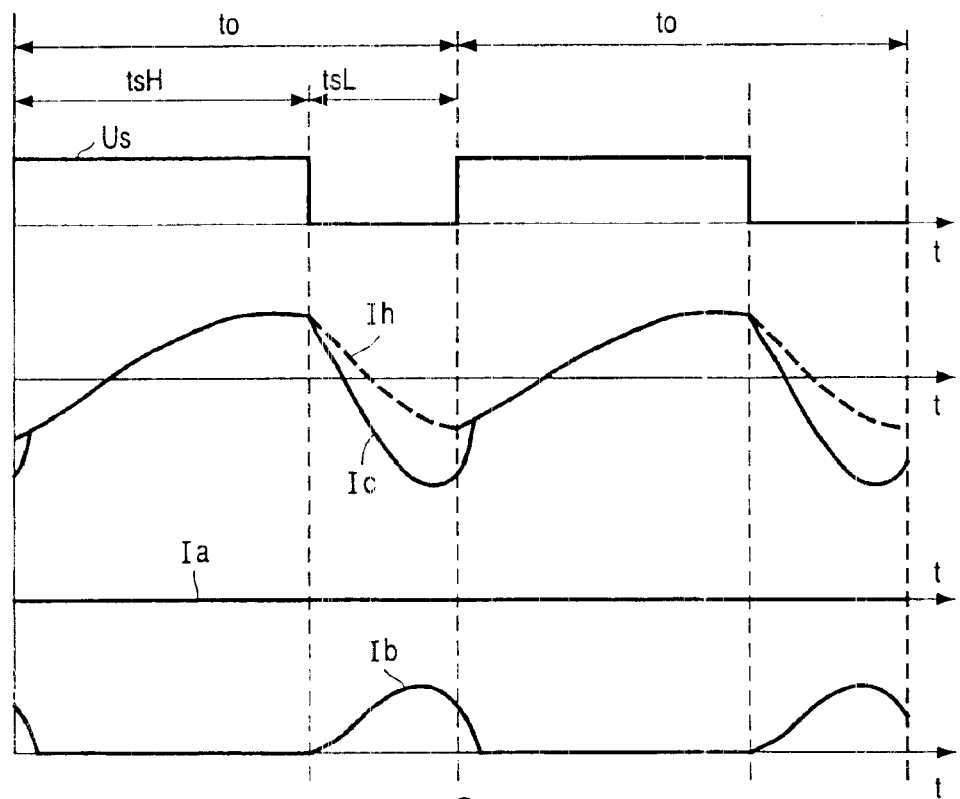

FIGS. 5 to 7 show how it is possible to regulate the output voltages Ua and Ub by adjusting the frequency f0 and/or the cycle period t0=1/f0 and the duty cycle of the a-c voltage Us. The duty cycle is here determined by the period of time tsH and tsL, the upper switching element 24 being switched on and the lower switching element 25 being switched off during a period of time tsH, and the upper switching element 24 being switched off and the lower switching element 25 being switched on during a period of time tsL. The duty cycle is obtained as tsH/t0. The characteristics of the a-c voltage Us, of the current Ic through the capacitor 3, of the current Ia through the main inductance La of the transformer 4, of the current Ia delivered by the secondary winding 6a and of the current Ib delivered by the secondary winding 6b are represented for each of two periods of time t0. All winding ratios in the underlying example according to the equivalent circuit in FIG. 4 are assumed to be one; furthermore, Lrsa is here equal to Lrsb.

FIG. 5 shows the operating state in which the frequency f0=1/t0 is set to 1.47 times fr, fr being the resonant frequency of the converter 1 and being approximately determined as $$fr = \frac{1}{2\pi}\sqrt{\frac{1}{C(3)[Lrp+Lh]}}$$

C(3) being the capacitance of the capacitor 3. In the operating instance according to FIG. 5 the duty cycle is selected as 50%. In this operating state the current characteristics of Ia and Ib are generated with substantially identical half-waves during the time periods tsH and tsL respectively. In the operating state according to FIG. 6 the frequency f0=1/t0 is increased 1.53 times fr. The duty cycle is reduced to 40%. The characteristic of the current Ia has remained substantially identical to the operating state in FIG. 5. The characteristic of the current Ib now has half-waves with reduced amplitude, so that the power carried to the output 7b by the secondary winding 6b is reduced. FIG. 7 shows an operating instance with a frequency f0=1/t0 equal to 1.55 times fr and a duty cycle of 65%. In this operating instance the current Ia is essentially reduced to zero and the amplitude of the half-waves of Ib increased in comparison to FIG. 6, so that in this operating instance the secondary winding 6a carries no power to the output 7a but, in comparison to FIG. 6, secondary winding 6b carries increased power to output 7b.

The examples of operating states according to FIGS. 5 to 7 show that with the converter circuit according to the invention a highly variable adjustment to different loads of the various converter outputs is possible. With the converter according to the invention it is possible, in particular, to achieve small tolerances of the output voltages even in the case of low output voltages and high output currents.

FIGS. 8 and 9 show variants of the converter 1 in FIG. 1, which are denoted by 1' and 1". In both variants the two secondary windings 6a and 6b are electrically coupled to each other; in this instance they are connected to a common ground potential. In the embodiment of the converter 1 according to FIG. 1 the secondary windings 6a and 6b are electrically separated from each other. In FIG. 8, moreover, as a further variant, an additional external inductance L1 is provided, which is arranged on the primary side of the transformer 4 between the capacitor 3 and the primary winding 5 and acts as an additional inductive resonant circuit element in addition to the inductance of the transformer 4. In the given type of transformer 4 with specific transformer inductance this additional inductance enables the resonant frequency of the converter to be adjusted. FIG. 9 shows additional external inductances L2a and L2b on the secondary side of the transformer 4. The inductance L2a is arranged between the secondary winding 6a and the diode Ta, the inductance L2b is connected between the secondary winding 6b and the diode Db. These two inductances also act as additional circuit elements and can be used to adjust the desired—possibly asymmetrical—power distribution between the outputs in nominal operation, for instance. Converter variants are obviously also possible, in which additional external inductances are provided both on the primary side of the transformer 4 and on the secondary side of the transformer 4.

FIG. 10 shows a converter variant 1''' with a larger number of converter outputs. In this instance the converter has four converter outputs. In addition to the primary winding 5 the transformer 4 now has two groups of secondary windings with different winding directions (indicated by the letters a and b), which comprise the secondary windings $6a1$ and $6a2$ on the one hand and the secondary windings $6b1$ and $6b2$ on the other. The secondary windings are connected via diodes Da1, Da2, Db1 and Db2 with output filters Fa1, Fa2, Fb1 and Fb2 to the converter outputs, which carry output voltages Ua1, Ua2, Ub1 and Ub2. The output voltages Ua1 and Ub1 are fed as measured variables to the regulating circuit 8. The regulating circuit 8 therefore in this case evaluates two output voltages, the one output voltage Ua1 being generated by the secondary winding $6a1$ from the group of secondary windings with the first winding direction. The other output voltage Ub1 fed to the regulating circuit 8 is assigned to the secondary winding $6b1$ from the group of secondary windings having the opposite winding direction. Here therefore, a measured variable, i.e. output voltage, is evaluated for each of the two groups having secondary windings of different winding directions and used for regulating purposes. This represents a particularly simple and effective method of regulating the output voltages of the converter.

FIG. 11 shows that as measured variables the regulating circuit evaluates either the actual voltages on the converter outputs or the voltages on the connected load of the converter, the latter being reduced compared to the corresponding output voltages, owing to voltage drops on the leads between the converter and the loads. Examples of both variants are represented in FIG. 11. The converter outputs here carry the two output voltages Ua and Ub, to each of which a load Ra and a load Rb is connected. The connecting leads between the converter output supplying the output voltage Ua and the load Ra are represented here by a block 31. The connecting leads between the output of the converter supplying the output voltage Ub and the load Rb are represented by the block 32.

FIG. 12 shows an example of embodiment of the regulating circuit 8. A first measuring signal Va and a second measuring signal Vb, which correspond to output voltages Ua and Ub and Ua1 and Ub1 respectively, are fed to the two inputs of the regulating circuit. The measuring signals Va and Vb are compared with reference signals Varef and Vbref. Subtracters 100 and 101 are used here. The subtracter 100 delivers the difference Varef−Va to a circuit block 102. The subtracter 101 delivers the difference Vbref−Vb to a circuit block 103. The circuit blocks 102 and 103 include amplifiers and scaling circuits, so that the difference signal supplied by the subtracter 100 is multiplied by a factor KA and the difference signal supplied by the subtracter 101 by a factor KB. Here in this example of embodiment the following relationship applies:

$$kA \cdot Varef = kB \cdot Vbref$$

The output signals from the circuit blocks 102 and 103 are further processed by an adder 104 and a subtracter 105. The adder 104 adds the output signals from the circuit blocks 102 and 103 together and delivers its output signal to a frequency controller 106, which is designed, for example, as a PID controller. The difference signal delivered by the subtracter 105 is fed to a duty cycle controller 107, which is also designed, for example, as a PID controller. A signal generator circuit 108 now generates the regulation signal 20 supplied to the inverter 2 by the regulating circuit 8, the regulation signal here being a pulse-width modulated signal. The frequency of the signal 20, which determines the frequency of the a-c voltage Us of the resonant converter, is set by the output signal of the frequency controller 106. The duty cycle of the signal 20, which determines the duty cycle of the a-c voltage Us, is adjusted by the duty cycle controller 107.

If the value of the measuring signal Va, for example, is reduced in the regulating circuit according to FIG. 12, so that Va becomes <Varef, this leads on the one hand to a reduction of the frequency set by the controller 106 and hence, according to the behavior of a resonant converter, to a tendency to increase on the part of the output voltages generated by the resonant converter. On the other hand, however, the error produced in this case also causes a reduction of the duty cycle of the signal 20 and the a-c voltage Us determined by the controller 107. This occurs, for example, in the operating state according to FIG. 6, where the power carried to the output $7a$ by the secondary winding $6a$ is increased in relation to the power carried to the output $7b$ by the secondary winding $6b$.

If in another instance, for example, the measuring signal Vb or the corresponding output voltage Ub is reduced, this likewise leads to a reduction of the frequency of the signals 20 or the frequency of the a-c voltage Us. In this case, however, the controller 107 brings about an increase of the duty cycle of the signal 20 and the duty cycle of the a-c voltage Us, so that in this operating instance the power distribution is modified so that the power carried to the output $7b$ is increased in comparison to the power carried to the output $7a$. The control characteristic also applies analogously to the design variants having more than two converter outputs.

FIG. 13 shows a circuit arrangement comprising the components of the regulating circuit 8 mentioned above and is complemented by an overload protection circuit and an overvoltage protection circuit; furthermore the half bridge driver circuit 21 forms part of this circuit arrangement.

The circuit arrangement shown in FIG. 13 is supplied with the measuring signals Va and Vb on the input side. An adder/subtracter device 201 is supplied with the measuring signal Va and a reference signal Varef. An adder/subtracter device 202 is supplied with the measuring signal Vb and a reference signal Vbref. Furthermore, comparing devices 203 and 204 are arranged as comparators. The comparator 203 compares the measuring signal Va with a maximum value Vamax. The comparator 204 compares the measuring signal Vb with a maximum value Vbmax. If the measuring signal Va exceeds the maximum value Vamax or if the measuring signal Vb exceeds the maximum value Vbmax, it is a case of overvoltage. For the case where the measuring signal Va exceeds the maximum value Vamax, the output voltage of the comparator 203 jumps from its minimum value Vkmin to its maximum value Vkmax. By weighting Vkmax with a weight Wa, an adaptation value 205 is generated which is applied to the adder/subtracter device 202. For the case where the measuring signal Vb exceeds the maximum value Vbmax, the output voltage of the comparator 204 jumps from its minimum value Vkmin to its maximum value Vkmax. By weighting Vkmax with a weight Wb, an adaptation value 206 is generated which is applied to the adder/subtracter device 201.

The adder/subtracter device 201 forms the difference between the reference signal Varef and the measuring signal Va and adds the adaptation value 206 to this difference. The adder/subtracter device 202 forms the difference between the reference signal Vbref and the measuring signal Vb and adds the adaptation value 205 to this difference. The outputs of the adder/subtracter devices 201 and 202 are connected to a circuit block 207 which comprises the components 102, 103, 104, 105, 106 and 107 of the regulating circuit 8 shown in FIG. 12 i.e. the outputs of the adder/subtracter devices 201 and 202 are connected to the inputs of the circuit blocks 102 and 103. The output signals 208 and 209 of the circuit block 207 i.e. the output signals of the controllers 106 and 107 are applied to the signal generator circuit 108 via two optocouplers 210 and 211 which cause a potential isolation to the signal generator circuit 108, which signal generator circuit 108 generates the regulation signal 20 and sets its frequency and duty cycle in dependence on the signals 208 and 209. The regulation signal 20 is converted as described above into control signals 22 and 23 by the half bridge driver circuit.

The circuit arrangement in FIG. 13 further includes a comparator circuit 212 which evaluates the respectively set duty cycle δ of the regulation signal 20. The duty cycle represents the power distribution over the various converter outputs of the respective converter. The comparator circuit 212 determines whether the duty cycle δ lies in a range between a predefinable minimum duty cycle value δmin and a predefinable maximum duty cycle value δmax. If the duty cycle δ lies outside the range between δmin and δmax— which is the case when there is overload (particularly a short-circuit at a converter output)—the comparator circuit 212 causes control information to be delivered by the signal generator circuit 108 to the half bridge driver circuit of the respective resonant converter, the control information causing the control signals 22 and 23 to be switched off and thus the respective resonant converter to be switched off. In the present case the control information is transferred because the regulation signal 20 and the control signals 22 and 23 are switched off, which is the simplest solution for the transmission of control information. After the control information has been delivered, the connected converter is switched off.

In the case of overvoltage i.e. when a converter output voltage exceeds a predefined permissible maximum value, so that Va becomes higher than Varef or Vb becomes higher than Vbref, the adding together of the adaptation values 205 and 206 in the adder/subtracter devices 201 and 202, respectively, forces the duty cycle δ to be situated outside the range δmin<δ<δmax. As described above, this leads to the release of control information which here causes the connected converter to be switched off.

Blocks 213 and 214 indicate how circuit portions of the circuit arrangement shown in FIG. 13 can be preferably combined by means of one or a plurality of integrated circuits; block 213 and/or block 214 are then arranged by an integrated circuit. Block 213 comprises the circuit portions referred to as 21, 108, 212, 213, δmax and δmin; block 213 is supplied on its input side with the output signals from the optocoupler 210 and 211 and on the output side the control signals 22 and 23 are produced. Block 214 comprises the circuit portions referred to as Varef, Vbref, 201, 202, 203, 204, 205, Wa and Wb. Block 214 takes up on the input side the measuring signals Va and Vb; on the output side the block 214 delivers the signals 208 and 209 to the optocouplers 210 and 211.

What is claimed is:

1. A circuit arrangement comprising a regulating circuit (8) which is used for generating a pulse-width modulated regulation signal (20) in dependence on two measuring signals (Va, Vb) present on inputs of the regulating circuit (8) and comprising a comparator circuit (212) for comparing the duty cycle (δ) of the regulation signal (20) with a predefinable maximum duty cycle value (δmax) and a predefinable minimum duty cycle value (δmin), said predefinable maximum and minimum duty cycle values (δmax and δmin) being input to said comparator circuit (212), wherein if the duty cycle (δ) is outside the range between the maximum duty cycle value (δmax) and the minimum duty cycle value (δmin) the circuit arrangement produces control information that corresponds to this exceeding of the range.

2. A circuit arrangement as claimed in claim 1, characterized in that the control information is generated by switching off the regulation signal (20).

3. A circuit arrangement as claimed in claim 1, characterized in that a first comparator device (203) is provided for comparing one (Va) of the two measuring signals with a first maximum value (Vamax), an adaptation of the duty cycle (δ) caused by the generation of the control information taking place when the first maximum value (Vamax) is exceeded.

4. A circuit arrangement as claimed in claim 3, characterized in that the second comparator device (204) is provided for comparing the other one (Vb) of the two measuring signals with a second maximum value (Vbmax), an adaptation of the duty cycle (δ) caused by the generation of the control information taking place when the second maximum value (Vbmax) is exceeded.

5. A circuit arrangement as claimed in claim 4, characterized in that a first adder/subtracter device (201) is provided which forms a first difference (Varef−Va) between one (Va) of the two measuring signals and a first reference value (Varef), in that a second adder/subtracter device (202) is provided for forming a second difference (Vbref−Vb) between the other one (Vb) of the two measuring signals and a second reference value (Vbref), in that for the case where the first one (Va) of the two measuring signals exceeds a predefinable first maximum value (Vamax), the second difference (Vbref−Vb) is adapted by the second adder/subtracter device (202) by a predefinable first adaptation value (205), in that for the case where the second one (Vb) of the two measuring signals exceeds a predefinable second maximum value (Vbmax), the first difference (Varef−Va) is adapted by the first adder/subtracter device (201) by a predefinable second adaptation value (206), in that the regulation signal (20) is adapted in dependence on the output signals of the adder/subtracter devices (201, 202) which output signals are determined by the first and second differences (Varef−Va, Vbref−Vb) and by the first and second adaptation values (205, 206).

6. A circuit arrangement as claimed in claim 1, characterized in that the circuit arrangement comprises two sub-circuits (213, 214) which are mutually coupled by two optocouplers (210, 211).

7. A resonant converter comprising a circuit arrangement as claimed in claim 1.

8. An integrated circuit (213) comprising a signal generator (108) for generating a pulse-width modulated regulation signal (20) and including a comparator circuit (212) for comparing the duty cycle (δ) of the regulation signal (20) with a predefinable maximum duty cycle value and a predefinable minimum duty cycle value, said predefinable maximum and minimum duty cycle values being input to said comparator circuit (212), wherein if the duty cycle (δ) is outside the range between the maximum duty cycle value (δmax) and the minimum duty cycle value (δmin) the integrated circuit (213) delivers control information that corresponds to this exceeding of the range.

9. An integrated circuit as claimed in claim 8, characterized in that the circuit (213) also includes a half bridge driver circuit (21).

10. A resonant converter comprising an integrated circuit as claimed in claim 8.

11. An integrated circuit, comprising a first adder/subtracter device (201) which forms a first difference (Varef−Va) between a first measuring signal (Va) and a first reference value (Varef), and a second adder/subtracter device (202) which forms a second difference (Vbref−Vb) between a second measuring signal (Vb) and a second reference value (Vbref), in that for the case where the first measuring signal (Va) exceeds a predefinable first maximum value (Vamax), the second difference (Vbref−Vb) is adapted by the second adder/subtracter device (202) by a predefinable first adaptation value (205), in that for the case where the second measuring signal (Vb) exceeds a predefinable second maximum value (Vbmax), the first difference (Varef−Va) is adapted by the first adder/subtracter device (201) by a predefinable second adaptation value (206).

12. A resonant converter comprising an integrated circuit as claimed in claim 11.

* * * * *